United States Patent
Murata

(10) Patent No.: US 8,724,150 B2
(45) Date of Patent: May 13, 2014

(54) STORAGE MEDIUM STORING PRINTER DRIVER AND INFORMATION PROCESSING APPARATUS

(75) Inventor: Mareyuki Murata, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 110 days.

(21) Appl. No.: 13/411,735

(22) Filed: Mar. 5, 2012

(65) Prior Publication Data

US 2012/0250084 A1    Oct. 4, 2012

(30) Foreign Application Priority Data

Mar. 29, 2011  (JP) .................................. 2011-072971

(51) Int. Cl.
*G06F 15/00*    (2006.01)

(52) U.S. Cl.
USPC ........................................................ 358/1.15

(58) Field of Classification Search
USPC ........................................................ 358/1.15
See application file for complete search history.

(56) References Cited

U.S. PATENT DOCUMENTS

| | | | |
|---|---|---|---|
| 6,148,346 A | * | 11/2000 | Hanson .......................... 719/321 |
| 6,661,530 B1 | | 12/2003 | Munetomo et al. |
| 2008/0180741 A1 | | 7/2008 | Miyata |

FOREIGN PATENT DOCUMENTS

| | | |
|---|---|---|
| JP | HEI 11-143664 A | 5/1999 |
| JP | 2000-066849 A | 3/2000 |
| JP | 2003-091387 A | 3/2003 |
| JP | 2008-186194 A | 8/2008 |

* cited by examiner

*Primary Examiner* — Saeid Ebrahimi Dehkordy
(74) *Attorney, Agent, or Firm* — Banner & Witcoff, Ltd.

(57) ABSTRACT

A storage medium stores a printer driver that controls an information processing apparatus. The printer driver, when executed, causes the information processing apparatus to provide an application with setting values corresponding to options for an item for specifying a print setting and a driver setting option value corresponding to a driver setting option that indicates that the item is allowed to be specified in a driver-side input interface, and receive a result of the selected option in an application-side setting process. When the result received is the driver setting option, display a setting value as the setting value for the item and allowing the value for the item to be changed through the driver-side input interface. When the result received is the option other than the driver setting option, display a setting value that corresponds to the option selected in the application-side setting process as the value for the item.

19 Claims, 11 Drawing Sheets

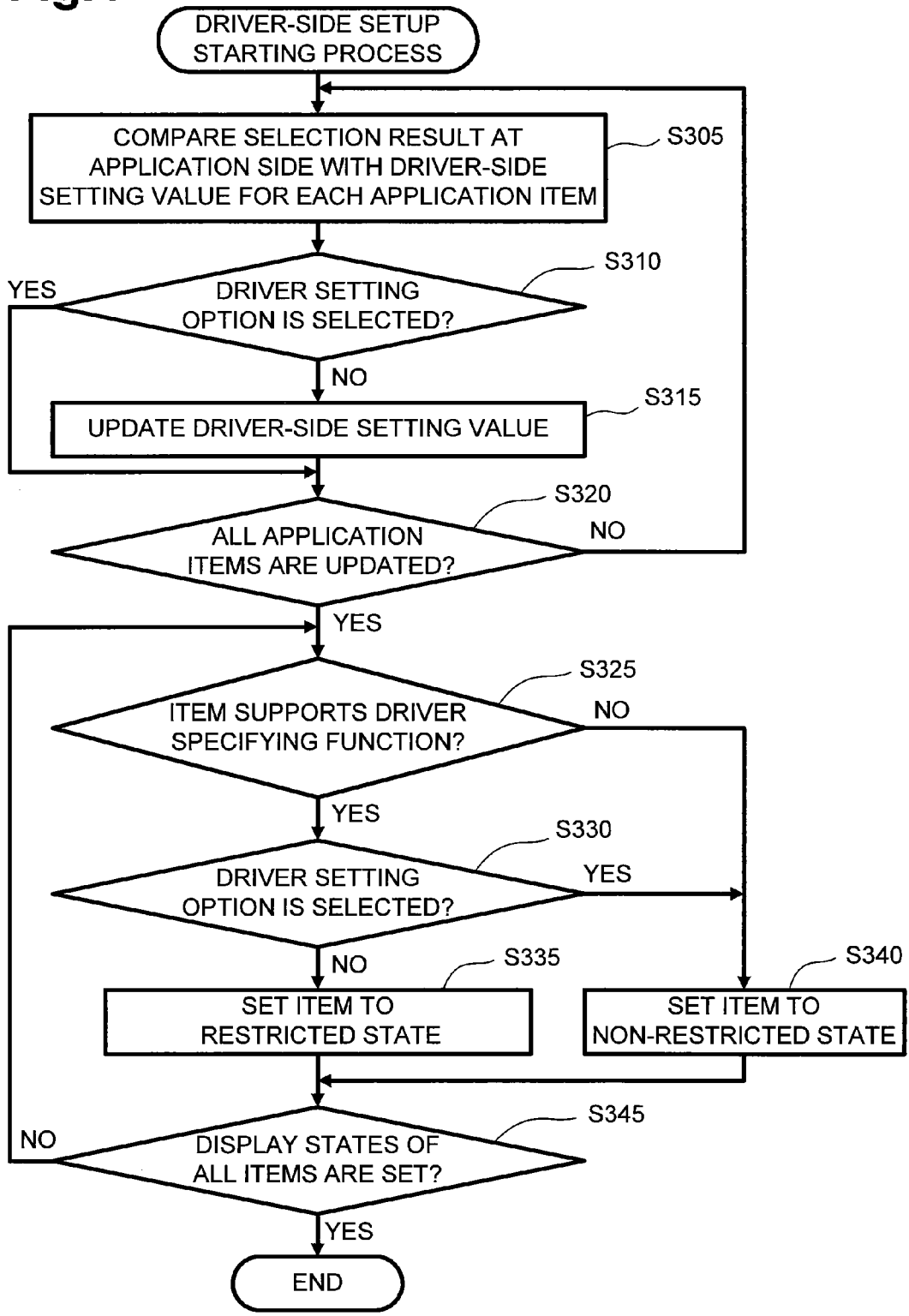

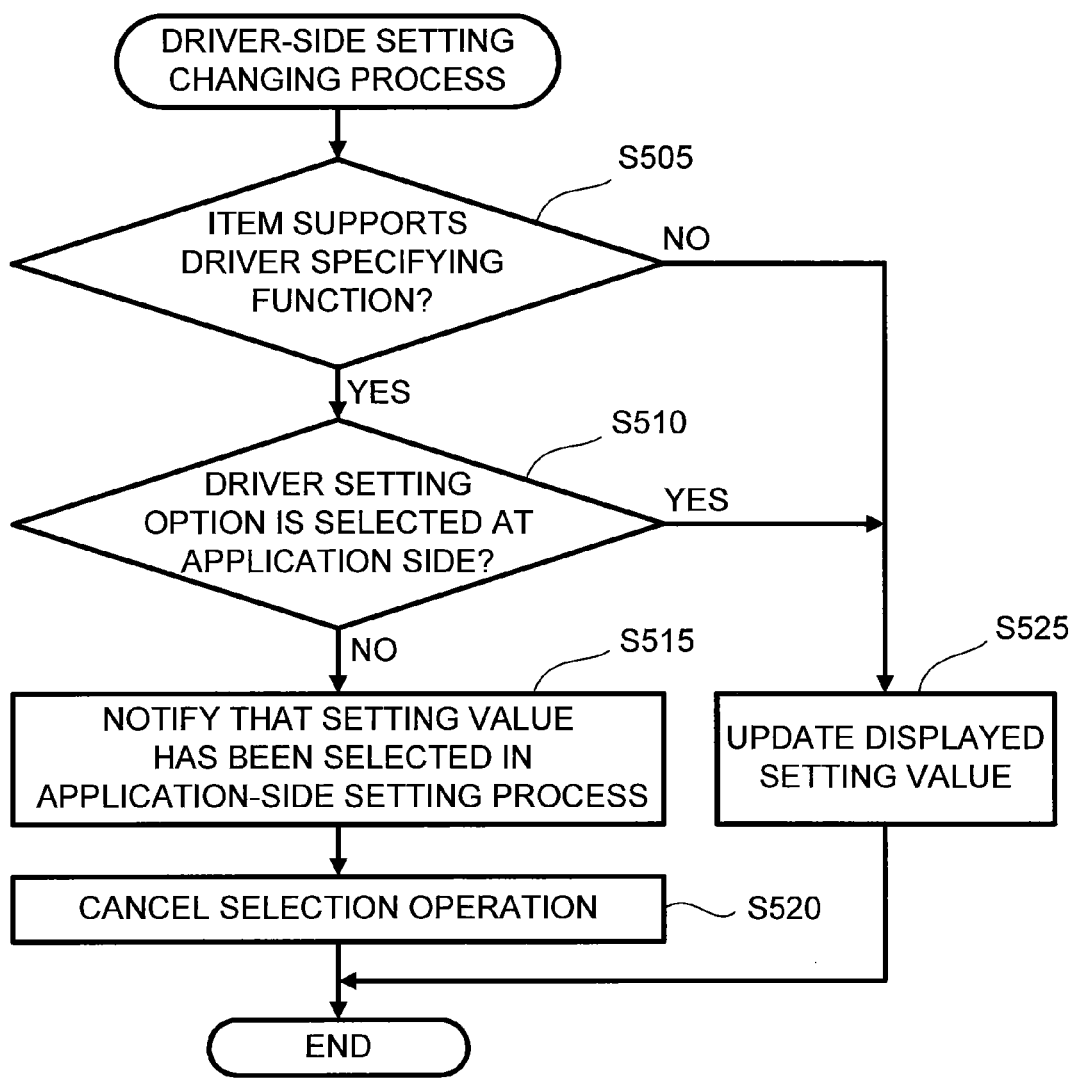

STORAGE MEDIUM STORING PRINTER DRIVER AND INFORMATION PROCESSING APPARATUS

CROSS-REFERENCE TO RELATED APPLICATION

This application claims priority from Japanese Patent Application No. 2011-072971, filed on Mar. 29, 2011, which is incorporated herein by reference.

BACKGROUND

1. Field

Aspects of this disclosure relate to a storage medium storing a printer driver and an information processing apparatus causing a printer apparatus to perform printing.

2. Description of Related Art

Printer drivers installed in personal computers (PCs) perform print setting processes to set various items concerning printing, such as sheet sizes, printing qualities, and page layouts used in printing in response to instructions from users. However, the settings of some of the above items including the sheet sizes are changed in applications installed in the PCs in response to instructions from the users. Accordingly, the settings made in the applications concerning such items may be different from the settings made in the printer drivers concerning the items and the users may be confused.

To counter the above situation, certain items that can be set in the applications may be inhibited from being set, the items may be cleared from the screens, or warnings may be issued in response to operations to set the items in the print setting processes in the printer drivers.

SUMMARY

With the above configuration, since the setting of the items that can be set in the applications may be restricted in the print setting processes performed by the printer drivers, priority may be provided to the setup in the applications, thereby preventing the users from being confused. However, user friendliness can be improved by providing priority to the setup in the applications only when the users intend to do so.

Aspects of the disclosure provide a storage medium storing a printer driver and an information processing apparatus, which may be capable of preventing a user who performs the setup concerning printing from being confused while improving user friendliness.

BRIEF DESCRIPTION OF THE DRAWINGS

For a more complete understanding of the disclosure, reference now is made to the following description taken in connection with the accompanying drawings.

FIG. 4 is a flow chart depicting a driver-side setup starting process according to one or more aspects of the disclosure.

FIG. 6A is a flow chart depicting a driver-side setting changing process according to one or more aspects of the disclosure and FIG. 6B illustrates an example of a warning screen.

DETAILED DESCRIPTION

Illustrative embodiments will herein be described with reference to the attached drawings. The present invention is not limited to the embodiments described below and various modifications can be made within the technical scope of the present invention.

[Description of Configuration]

Figure 1:
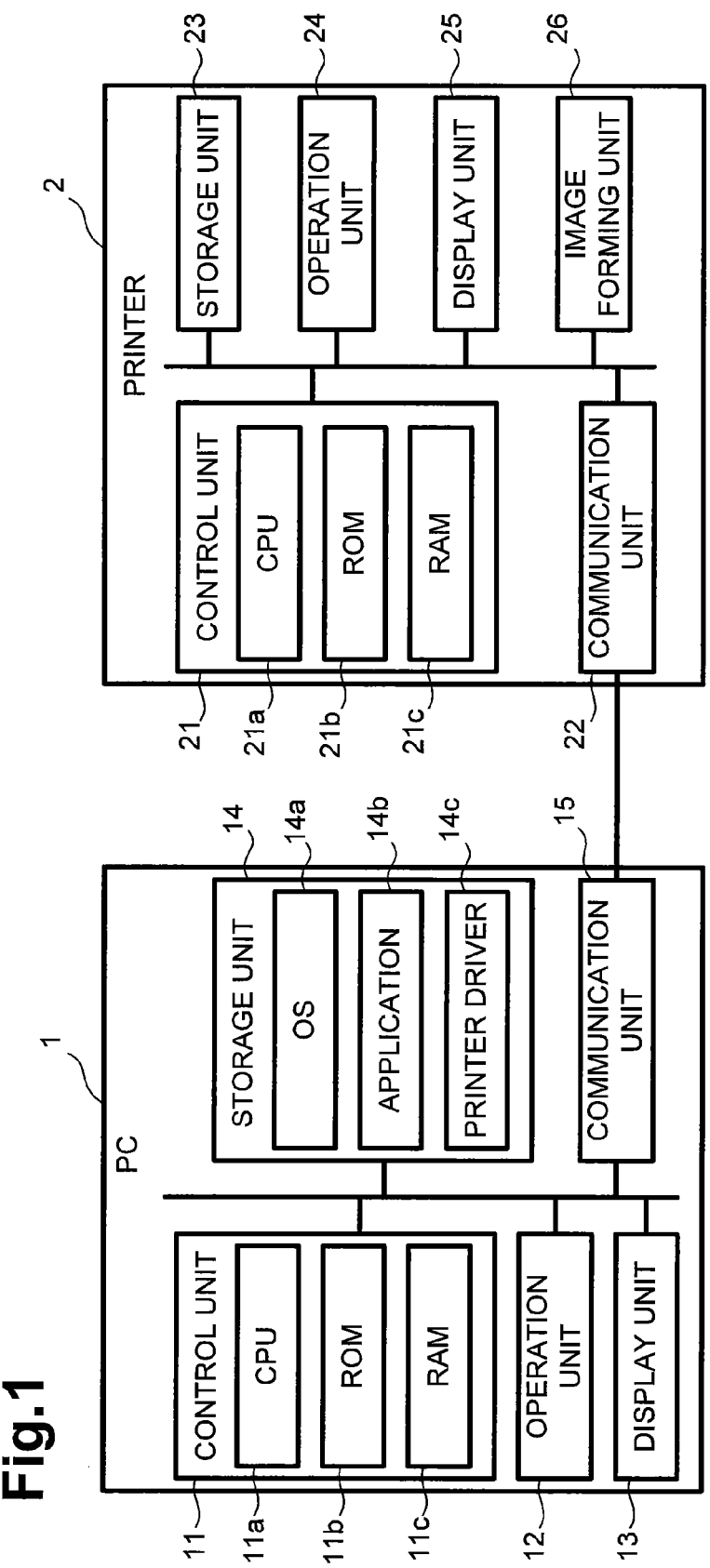
FIG. 1 is a block diagram depicting an example of the configuration of a printing system including a PC and a printer according to one or more aspects of the disclosure.

FIG. 1 is a block diagram schematically depicting an example of the configuration of a printing system according to a first illustrative embodiment. A PC 1 may be capable of data communication with a printer 2 in the printing system.

PC 1 may be a general-purpose information processing apparatus and may include a control unit 11, an operation unit 12, a display unit 13, a storage unit 14, and a communication unit 15. Control unit 11 may integrally control each component in PC 1 and may include a central processing unit (CPU) 11a, a read only memory (ROM) 11b, and a random access memory (RAM) 11c.

An input unit such as operation unit 12 may be used by a user to input an instruction by an external operation. A keyboard and a pointing device (for example, a mouse or a touch pad) may be used as operation unit 12.

Display unit 13 may be an output unit that may display a variety of information as images visible to the user. A liquid crystal display may be used as display unit 13. Storage unit 14 may be a non-volatile storage unit capable of rewriting data that may be stored therein. A hard disk unit may be used as storage unit 14. For example, an operating system (OS) 14a, an application 14b such as a word processor, and a printer driver 14c, which is software (a program) causing printer 2 to be used from PC 1, may be installed in storage unit 14.

Communication unit 15 may be an interface for the data communication with printer 2. PC 1 may be an example of an information processing apparatus. Printer 2 may be an image forming apparatus (a printing apparatus) and may include a control unit 21, a communication unit 22, a storage unit 23, an operation unit 24, a display unit 25, and an image forming unit 26.

Control unit 21 may integrally control each component in printer 2 and may include a CPU 21a, a ROM 21b, and a RAM 21c. Communication unit 22 may be an interface for the data communication with PC 1.

Storage unit 23 may be a non-volatile storage unit capable of rewriting data that may be stored therein. A flash memory may be used as storage unit 23. Operation unit 24 may be an input unit used by the user to input an instruction by an external operation and may include various operation buttons.

Display unit 25 may be an output unit that may display a variety of information as images visible to the user. A liquid crystal display may be used as display unit 25. Image forming unit 26 may form an image on a sheet of paper serving as a recording medium by attaching a colorant on the sheet of paper.

[Description of Operation]

A process of setting printer 2, performed in PC 1 of the first illustrative embodiment, will now be described. The programs including application 14b and printer driver 14c may be described to perform the processing in the following description. This means that the processing is performed by CPU 11a in PC 1 operating in accordance with the programs.

Figure 2A:
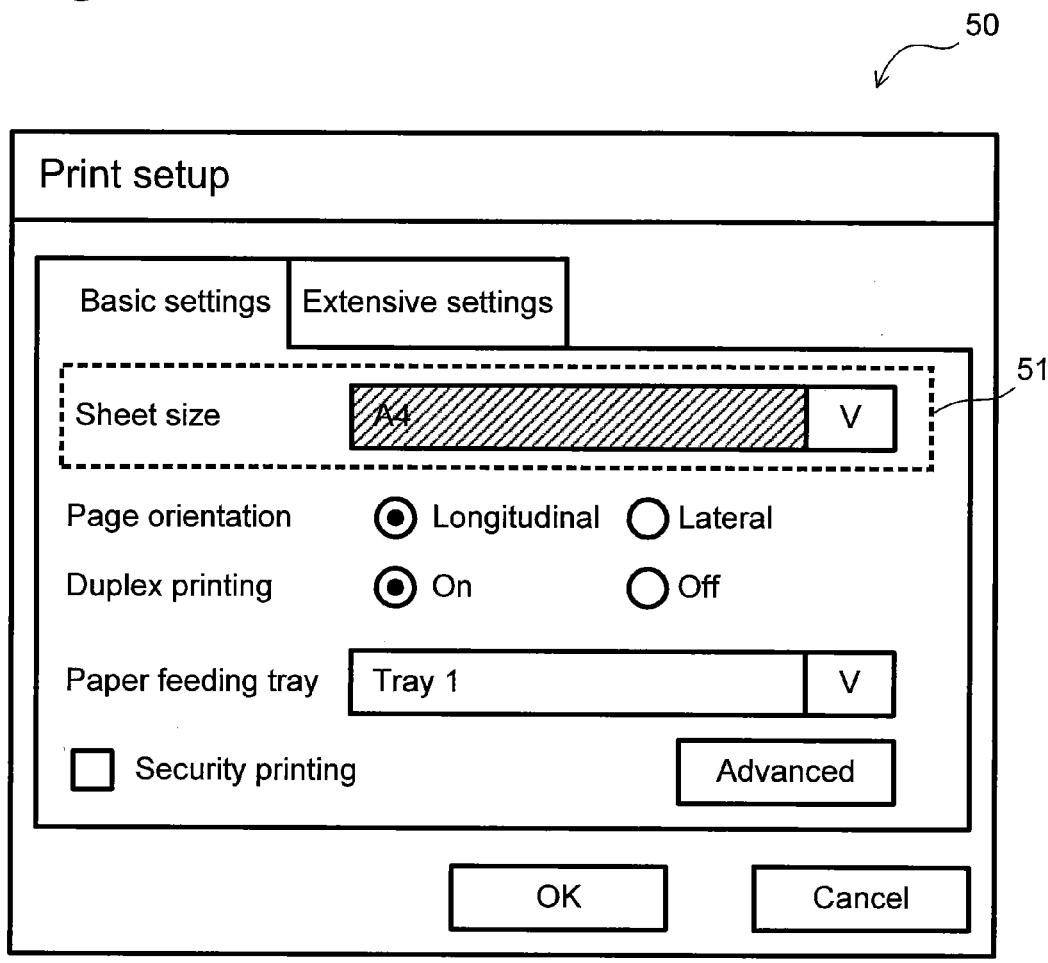
FIG. 2A illustrates an example of a driver-side print setup screen and FIG. 2B illustrates an example of an application-side print setup screen according to one or more aspects of the disclosure.

Printer driver 14c may display a driver-side print setup screen 50 (refer to FIG. 2A) in display unit 13 in response to an instruction from the user to perform a driver-side setting process. The driver-side setting process allows a user to set items including a "sheet size", a "page orientation", "duplex printing", and a "paper feeding tray" for printing by printer 2. On driver-side print setup screen 50, a driver-side setting value corresponding to an item may be updated in response to a selection operation in which the setting value for the item is selected by the user with operation unit 12 and a determination operation in which the selection performed by the user with operation unit 12 is determined. Then, printer driver 14c may generate printing data from a file created in application 14b in accordance with the driver-side setting value to cause printer 2 to perform the printing.

The selection operation may include a series of operations to select the displayed setting value by moving a cursor or a mouse pointer and determining the selection of the setting value by clicking or pressing a return key, for example, when the setting values for the items are displayed as a pull-down menu.

Alternatively, for example, when check boxes corresponding to the setting values for the items are provided on driver-side print setup screen 50, the selection operation may include a series of operations to select any check box by moving the cursor or the mouse pointer and check the check box by clicking or pressing the return key.

The determination operation may include, for example, a series of operations to move the cursor or the mouse pointer to an "OK button" provided on driver-side print setup screen 50 and press the "OK button" by clicking or pressing the return key.

Figure 2B:
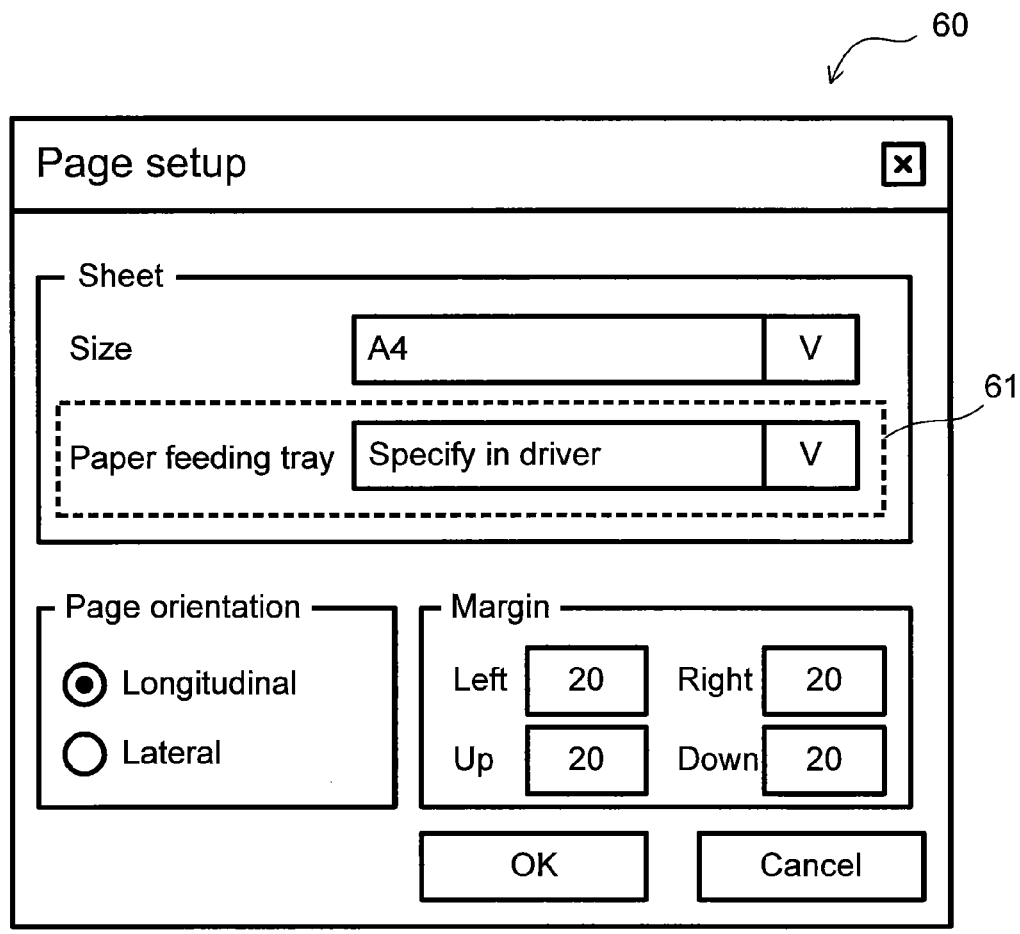

The setting may be performed also in an application-side setting process performed by application 14b for some of the items (hereinafter referred to as application items). In the application-side setting process, an application-side print setup screen 60 (refer to FIG. 2B) may be displayed in display unit 13. The driver-side setting value for each application item may be changed by the selection operation and the determination operation on application-side print setup screen 60 in the same manner as in the driver-side setting process.

If Windows® is used as OS 14a in PC 1, the driver-side setting value, etc. may be provided with a notification from printer driver 14c to application 14b by using a DEVMODE structure in the application-side setting process. During the application-side setting process or after the application-side setting process has been performed, the printer driver 14c may be notified of the setting after the change, etc. by application 14b by using the DEVMODE structure at certain timing and printer driver 14c may reflect the setting value in the driver-side setting value.

On application-side print setup screen 60, a driver setting option indicating that the setting in the driver-side setting process is enabled may be provided for a specific item among the application items in addition to the setting value.

According to one example, the "sheet size" (indicated as a "size" on application-side print setup screen 60) and the "paper feeding tray" may be set as the specific items. The driver setting option may be displayed in a paper feeding tray field 61 in which, for example, the setting value of the "paper feeding tray" may be displayed on application-side print setup screen 60.

If any setting value has been selected in the application-side setting process that has been previously performed, for example, in the setting of the specific items, the setting value may be prevented from being changed in the driver-side setting process. In contrast, if the driver setting option is selected, the setting value may be permitted to be changed. A function to prevent the setting value for the specific item from being changed in the driver-side setting process in accordance with the result of the selection in the application-side setting process is hereinafter referred to as a driver specifying function.

Various processes performed in printer driver 14c in order to realize the driver specifying function will be described. A supported option notifying process will now be described with reference to a flow chart in FIG. 3A. In the supported option notifying process, printer driver 14c may notify application 14b of the setting value for each application item and whether the application item supports the driver specifying function in response to an inquiry from application 14b. Application 14b may make the inquiry, for example, at the start of the application-side setting process.

Figure 3A:
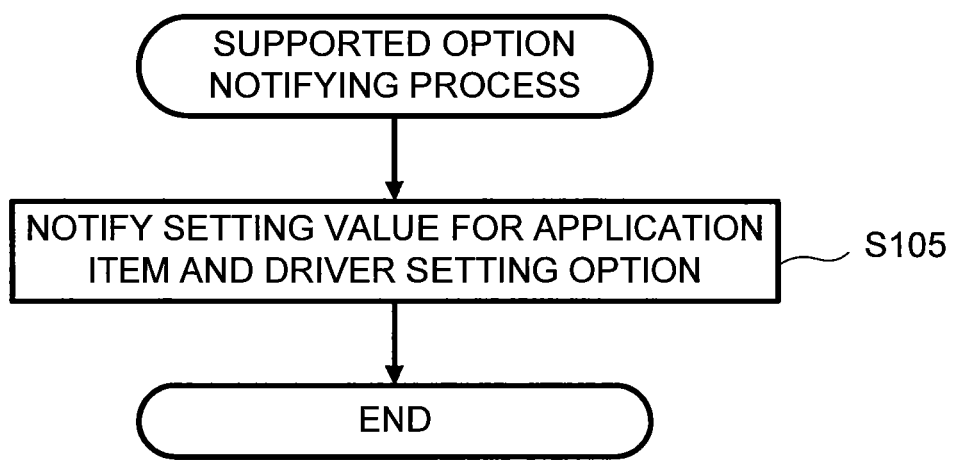
FIG. 3A is a flow chart depicting a supported option notifying process and FIG. 3B is a flow chart depicting a setting value notifying process according to one or more aspects of the disclosure.

Referring to FIG. 3A, in step S105, printer driver 14c may notify application 14b of each application item the setting of which is performed in the application-side setting process and the setting value for the application item. As for the specific item, printer driver 14c may notify application 14b of the provision of the driver setting option as one option and the setting value indicating that the driver setting option is provided as one option (the numerical value corresponding to the driver setting option). Then, the process in FIG. 3A may be terminated.

The supported option notifying process may be an example of a notifying process. A setting value notifying process will now be described with reference to a flow chart in FIG. 3B. In the setting value notifying process, printer driver 14c may notify application 14b of, for example, the driver-side setting value for the application item specified in an inquiry from application 14b in response to the inquiry. Application 14b may make the inquiry for each application item, for example, at the start of the application-side setting process. Then, application 14b may determine, for example, the setting value to be displayed on application-side print setup screen 60 in association with each application item at the start of the application-side setting process in response to a response to the inquiry.

Figure 3B:
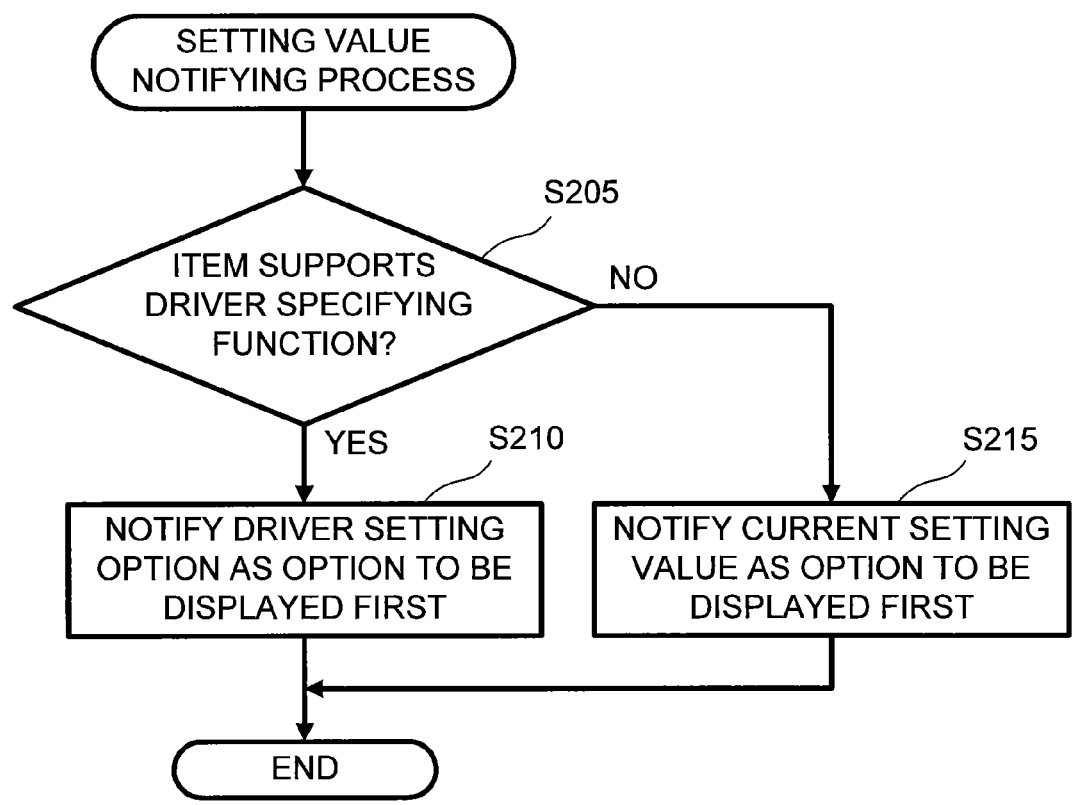

Referring to FIG. 3B, in step S205, printer driver 14c may determine whether the application item specified in the inquiry is the specific item (in other words, whether the application item specified in the inquiry supports the driver specifying function). If the determination in step S205 is affirmative (step S205: YES), the process may go to step S210. If the determination in step S205 is negative (step S205: NO), the process may go to step S215.

In step S210, printer driver 14c may notify application 14b of the driver setting option as the option to be displayed at the start of the application-side setting process. In addition, printer driver 14c may notify application 14b of the setting values that can be displayed as the options for the specified application item. Then, the process in FIG. 3B may be terminated.

In step S215, printer driver 14c may notify application 14b of the driver-side setting value as the option to be displayed at the start of the application-side setting process. In addition, printer driver 14c may notify application 14b of other setting values that can be displayed as the options for the specified application item and the driver setting option. Then, the process in FIG. 3B may be terminated. Printer driver 14c may notify application 14b of a setting value other than the driver-side setting value, such as the setting value that is estimated to have the highest selection frequency, as the option to be displayed at the start of the application-side setting process.

Step S210 may be an example of an instructing process. A driver-side setup starting process will now be described with reference to a flow chart in FIG. 4. In the driver-side setup starting process, printer driver 14c may set the display state of each item on driver-side print setup screen 50 depending on the result of the selection of, for example, the setting value for each application item in the application-side setting process. The driver-side setup starting process may be started when the driver-side setting process is invoked from application 14b, for example, during the application-side setting process.

Referring to FIG. 4, in step S305, printer driver 14c may select any application item the result of the selection of which in the application-side setting process that has been most recently performed or in the application-side setting process that is being performed is not reflected in the driver-side setting value. Then, printer driver 14c may compare the result of the selection of the application item in the application-side setting process with the driver-side setting value for the application item on the basis of the DEVMODE structure. Then, the process may go to step S310.

In step S310, printer driver 14c may determine whether the driver setting option is selected in the application-side setting process. If the application item that is being selected is the specific item and the driver setting option is selected in the application-side setting process (step S310: YES), the process may go to step S320. If the application item that is being selected is not the specific item or if any setting value for the application item is selected in the application-side setting process (step S310: NO), the process may go to step S315.

In step S315, printer driver 14c may update the driver-side setting value corresponding to the application item that is being selected with the setting value selected in the application-side setting process. Then, the process may go to step S320.

In step S320, printer driver 14c may determine whether the results of the selection in the application-side setting process may be reflected in the driver-side setting values for all the application items. If the determination in step S320 is affirmative (step S320: YES), the process may go to step S325. If the determination in step S320 is negative (step S320: NO), the process may go back to step S305.

In step S325, printer driver 14c may select any item the display state of which is not set and may determine whether the selected item is the specific item (that is, whether the selected item supports the driver specifying function). If the determination in step S325 is affirmative (step S325: YES), the process may go to step S330. If the determination in step S325 is negative (step S325: NO), the process may go to step S340.

In step S330, printer driver 14c may determine whether the driver setting option is selected for the specific item that is being selected in the application-side setting process. If the determination in step S330 is affirmative (step S330: YES), the process may go to step S340. If the determination in step S330 is negative (step S330: NO), the process may go to step S335.

In step S335, printer driver 14c may set the display state of the specific item that is being selected to a restricted state. Then, the process may go to step S345. Driver-side print setup screen 50 illustrated in FIG. 2A may show an example of a display mode in which the display state of the "sheet size", which is the specific item, is set to the restricted state. The setting value selected in the application-side setting process may be grayed out in a sheet size field 51 in which the setting value of the "sheet size" is displayed (a hatched portion in sheet size field 51 in FIG. 2A indicates the grayed-out state). The display mode of the restricted state is not so limited. For example, sheet size field 51 may not be displayed or the setting value in sheet size field 51 may not be displayed.

In step S340, printer driver 14c may set the display state of the item that is being selected to a non-restricted state. Then, the process may go to step S345. On driver-side print setup screen 50 in FIG. 2A, the display states of the "page orientation", the "duplex printing", and the "paper feeding tray" may be set to the non-restricted state. When the display state may be set to the non-restricted state, the current driver-side setting value may be displayed in the display field corresponding to each item. Printer driver 14c may display another setting value, such as the setting value estimated to have a higher selection frequency, instead of the current driver-side setting value.

The display of the specific item on driver-side print setup screen 50 in the display state set to the restricted state or the non-restricted state may be an example of presentation of information concerning an item in different modes.

In step S345, printer driver 14c may determine whether the display states may be set for all the items. If the determination in step S345 is affirmative (step S345: YES), the process in FIG. 4 may be terminated. If the determination in step S345 is negative (step S345: NO), the process may go back to step S325.

Step S305 to step S315 and step S330 may be examples of a determining process. Step S335 and step S340 may be examples of a setting process and a presenting process.

A driver-side setting value updating process will now be described with reference to a flow chart in FIG. 5. In the driver-side setting value updating process, printer driver 14c may update the driver-side setting value in accordance with the result of the selection of, for example, the setting value for each application item in the application-side setting process and may set the display state of each item on driver-side print setup screen 50 in accordance with the driver-side setting value after the update. The driver-side setting value updating process may be performed, if needed, during the application-side setting process or after the application-side setting process is finished.

Figure 5:
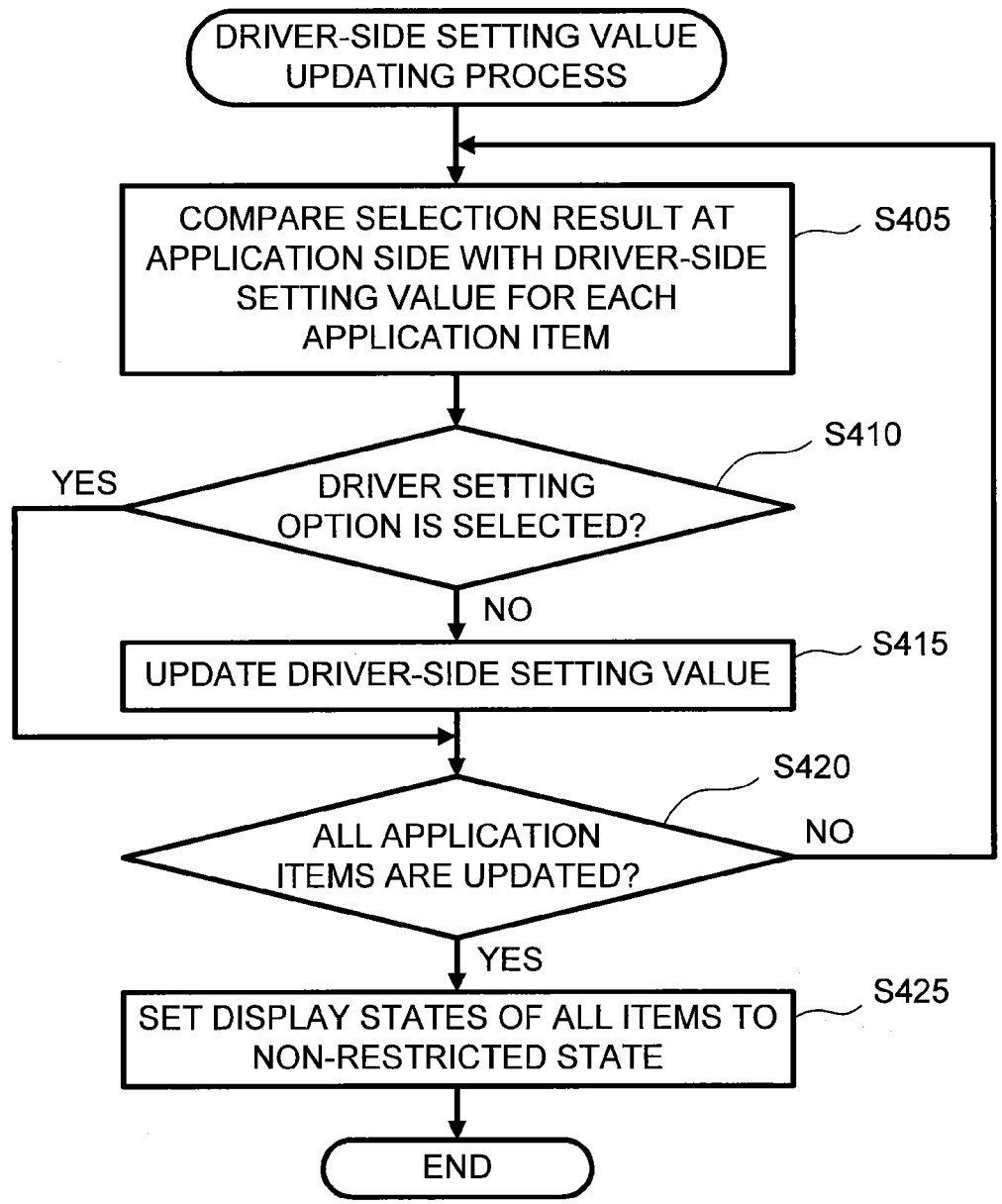
FIG. 5 is a flow chart depicting a driver-side setting value updating process according to one or more aspects of the disclosure.

Referring to FIG. 5, since the same processing as in step S305 to step S320 in the driver-side setup starting process is performed in step S405 to step S420, a description of step S405 to step S420 are omitted herein. In step S425, printer driver 14c may set the display states of all the items to the non-restricted state in which the current driver-side setting values corresponding to the items may be displayed. Then, the process in FIG. 5 may be terminated.

Figure 6B:
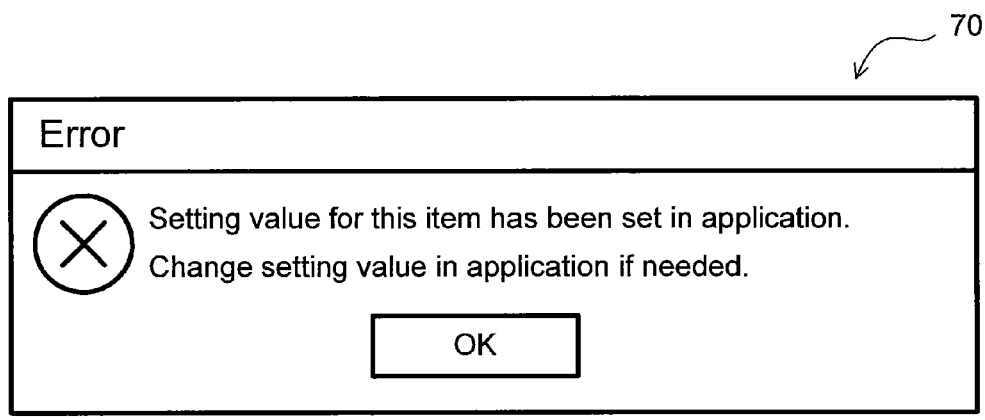

A driver-side setting changing process will now be described with reference to a flow chart in FIG. 6A. In the driver-side setting changing process, printer driver 14c may change the setting value displayed on driver-side print setup screen 50 in association with each item in accordance with the selection operation in the driver-side setting process. The driver-side setting changing process may be performed in response to the selection operation by the user.

Referring to FIG. 6A, in step S505, printer driver 14c may determine whether the item for which the selection operation by the user is performed is the specific item (that is, whether the item supports the driver specifying function). If the determination in step S505 is affirmative (step S505: YES), the process may go to step S510. If the determination in step S505 is negative (step S505: NO), the process may go to step S525.

In step S510, printer driver 14c may determine whether the driver setting option may be selected in the application-side setting process for the specific item for which the selection operation may be performed before the driver-side setting process is invoked. If the determination in step S510 is affirmative (step S510: YES), the process may go to step S525. If the determination in step S510 is negative (step S510: NO), the process may go to step S515.

In step S515, printer driver 14c may indicate that the setting value has been selected for the specific item for which the selection operation is performed in the application-side setting process. Then, the process may go to step S520. Specifically, for example, a warning screen 70 illustrated in FIG. 6B may be displayed in display unit 13 as the indication.

In step S520, printer driver 14c may cancel the selection operation. Then, the process in FIG. 6A may be terminated. In step S525, printer driver 14c may update the setting value displayed on driver-side print setup screen 50 for the item for which the selection operation is performed in response to the selection operation. Then, the process in FIG. 6A may be terminated.

The driver-side setting process may be an example of a setting process.

A process of setting printer 2, performed in PC 1 of a second illustrative embodiment, will now be described. Although the same processing as in the first illustrative embodiment may be performed also in PC 1 of the second illustrative embodiment, the content of the driver-side setting changing process is different from that in the first illustrative embodiment. Accordingly, the driver-side setting changing process in the second illustrative embodiment will now be described with reference to a flow chart depicted in FIG. 7A.

Figure 7A:
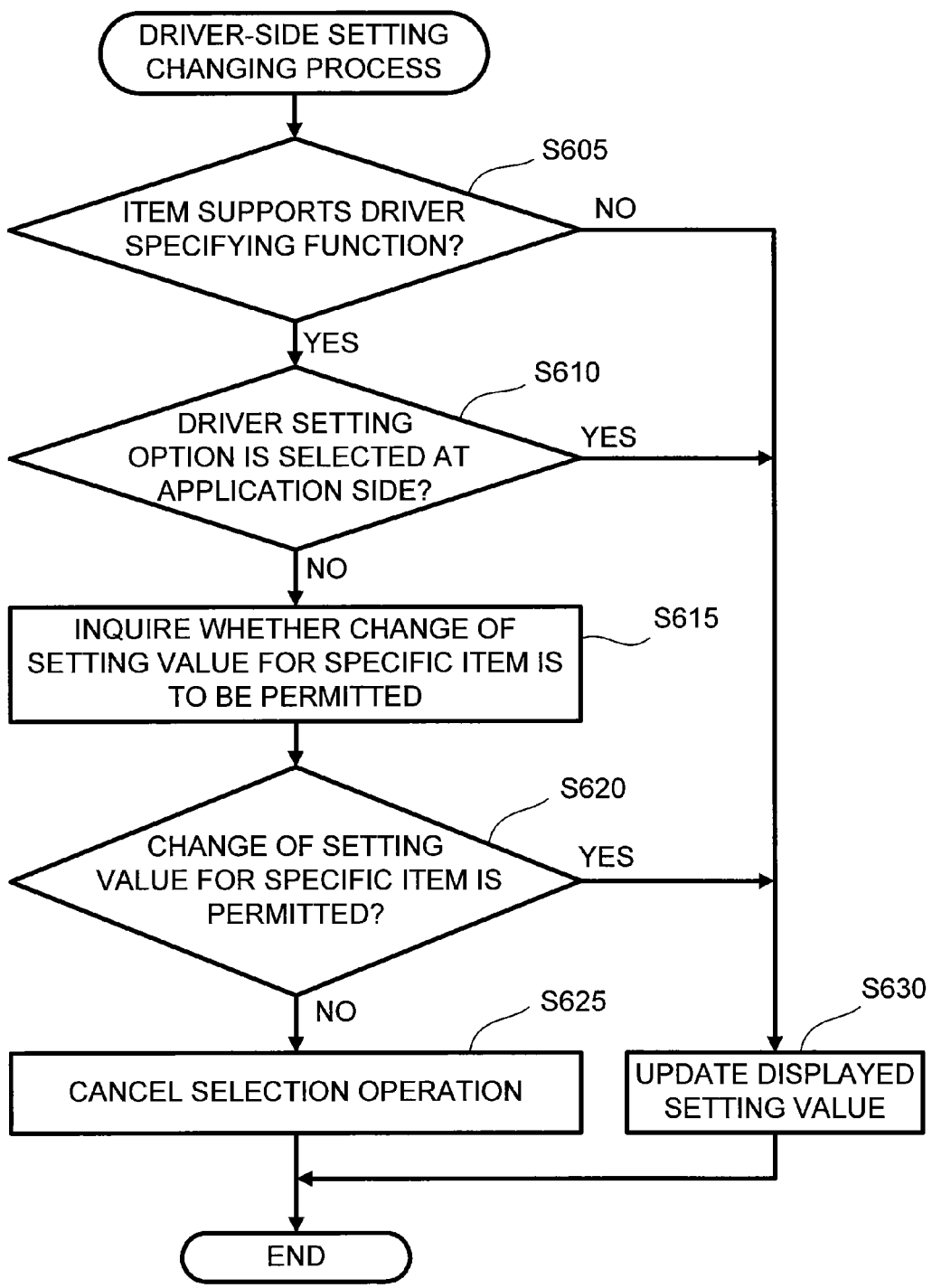
FIG. 7A is a flow chart depicting a driver-side setting changing process according to one or more aspects of the disclosure and FIG. 7B illustrates an example of an inquiry screen.
Figure 7B:
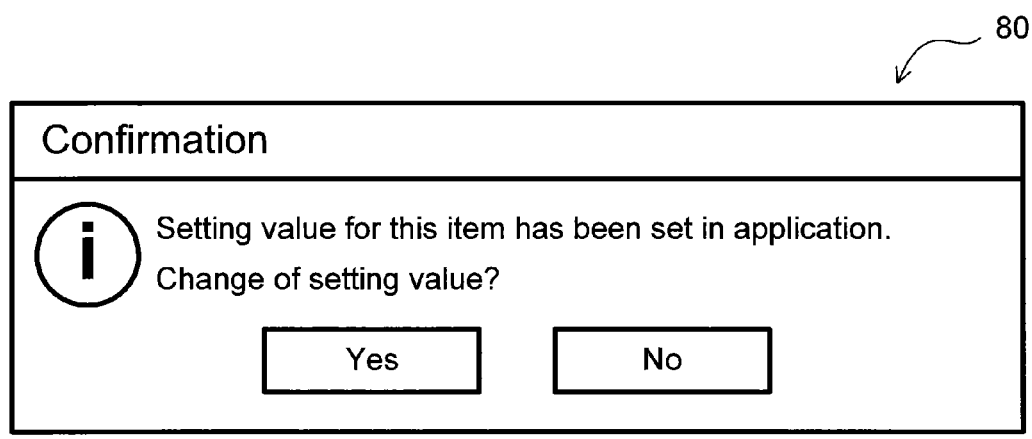

Since step S605 and step S610 in FIG. 7A are the same as step S505 and step S510 in the first illustrative embodiment, a description of step S605 and step S610 is omitted herein. In step S615, printer driver 14c may indicate that the setting value has been selected in the application-side setting process for the specific item for which the selection operation is performed and inquires whether the change of the setting value for the specific item is to be permitted. Then, the process may go to Step S620. Specifically, for example, an inquiry screen 80 illustrated in FIG. 7B may be displayed in display unit 13 for the inquiry or the like.

In step S620, printer driver 14c may determine whether the change of the setting value for the specific item for which the selection operation is performed is permitted on the basis of an operation by the user input on inquiry screen 80. If the determination in step S620 is affirmative (step S620: YES), the process may go to step S630. If the determination in step S620 is negative (step S620: NO), the process may go to step S625.

In step S625, printer driver 14c may cancel the selection operation. Then, the process in FIG. 7A may be terminated. In Step S630, printer driver 14c may update the setting value displayed on driver-side print setup screen 50 for the item for which the selection operation is performed in response to the selection operation. Then, the process in FIG. 7A may be terminated.

According to printer driver 14c of each of the first and second illustrative embodiments, when any setting value is selected for the specific item in the application-side setting process, driver-side print setup screen 50 may be displayed in a state in which the result of the selection may be reflected in the driver-side setting process invoked from application 14b. In addition, when any setting value is selected for the specific item in the application-side setting process, the change of the setting value for the specific item on driver-side print setup screen 50 may be inhibited or the setting value for the specific item may be changed through the inquiry to the user by requesting confirmation.

Accordingly, for example, when the driver-side setting process is invoked from application 14b during the application-side setting process and application-side print setup screen 60 and driver-side print setup screen 50 are simultaneously invoked, it may be possible to prevent the setting values selected in the respective setup screens from being different from each other. In addition, it may be possible to prevent the user from erroneously changing the setting value in the driver-side setting process despite the fact that the setting value for the specific item has been selected in the application-side setting process.

In contrast, when the driver setting option is selected for the specific item in the application-side setting process, the current driver-side setting value may be displayed as the setting value for the specific item in the driver-side setting process invoked from application 14b and, for example, the change of the setting value may be not prevented. In other words, it may be possible to change the setting value for the specific item in the driver-side setting process in accordance with the intent of the user.

Accordingly, it may be possible to prevent the user who performs the setup concerning the printing from being confused while improving user friendliness.

The driver-side setting changing process of each of the first and second illustrative embodiments is performed in response to the selection operation, and warning screen 70 or inquiry screen 80 may be displayed when the target for the selection operation is the specific item for which an option other than the driver setting option is selected in the application-side setting process. However, the driver-side setting changing process is not limited to the above process. For example, printer driver 14c may perform the driver-side setting changing process when part of the selection operation is performed, such as in a case in which the cursor enters a portion where the specific item is displayed on driver-side print setup screen 50. Also in such a case, the same advantages may be realized.

In the first illustrative embodiment, when the setting value for the specific item is selected in the application-side setting process, the display state of the specific item may be set to the restricted state in the driver-side setup starting process (step S335). In addition, when the selection operation is performed for the specific item, the fact that the setting value for the specific item has been selected in the application-side setting process may be indicated in the driver-side setting changing process (step S515) and the selection operation may be canceled (step S520).

However, even if all of step S335, step S515, and step S520 are not performed, performing at least one of the above steps may provide the same advantages. In contrast, in the second illustrative embodiment, when the setting value for the specific item is selected in the application-side setting process, the display state of the specific item may be set to the restricted state in the driver-side setup starting process (step S335). In addition, when the selection operation is performed for the specific item, the inquiry of whether the change of the setting value for the specific item is to be permitted may be made in the driver-side setting changing process (step S615).

However, even if both step S335 and step S615 are not performed, performing at least one of the above steps may provide the same advantages.

In the above-described illustrative embodiments, a single CPU 11a may perform all of the processes. Nevertheless, the invention may not be limited to the specific embodiment thereof, and a plurality of CPUs, a special application specific integrated circuit ("ASIC"), or a combination of a CPU and an ASIC may be used to perform the processes.

While the invention has been described in connection with various example structures and illustrative embodiments, it will be understood by those skilled in the art that other variations and modifications of the structures and embodiments described above may be made without departing from the scope of the invention. Other structures and embodiments will be apparent to those skilled in the art from a consideration of the specification or practice of the invention disclosed herein. It is intended that the specification and the described examples are illustrative with the true scope of the invention being defined by the following claims.

What is claimed is:

1. A non-transitory storage medium storing a printer driver that controls an information processing apparatus, the printer driver, when executed by a processor, causing the information processing apparatus to perform the steps of:
presenting an application-side print setting interface associated with an application on a display, the application-side print setting interface providing for an item setting values corresponding to each option for the item for specifying a print setting in a printing apparatus and a driver setting option value corresponding to a driver setting option that indicates that the item is allowed to be specified through a driver-side input interface for the printing apparatus;
receiving a result of which option presented to the application is selected through the application-side print setting interface;
when the result received is the driver setting option, presenting the driver-side input interface which provides a setting value on the display as the setting value for the item and allowing the setting value for the item to be changed through the driver-side input interface; and
when the result received is not the driver setting option, presenting the driver-side input interface which provides a setting value that corresponds to the option selected through the application-side print setting interface on the display as the setting value for the item.

2. The non-transitory storage medium according to claim 1, wherein the printer driver, when executed by the processor, further causes the information processing apparatus to perform the step of, when the result received is not the driver setting option, preventing the setting value for the item from being changed through the driver-side input interface.

3. The non-transitory storage medium according to claim 1, wherein the printer driver, when executed by the processor, further causes the information processing apparatus to perform the step of, when the result received is not the driver setting option, providing a notification that the setting value for the item has been set in the application-side print setting interface when an operation to change the setting value for the item has been attempted.

4. The non-transitory storage medium according to claim 1, wherein the printer driver, when executed by the processor, further causes the information processing apparatus to perform the step of, when the result received is not the driver setting option, presenting the setting value for the item on the display to indicate that the item is not allowed to be specified through the driver-side input interface.

5. The non-transitory storage medium according to claim 1, wherein the printer driver, when executed by the processor, further causes the information processing apparatus to perform the step of:
instructing the application to initially present the driver setting option value as the setting value for the item in the application-side print setting interface.

6. The non-transitory storage medium according to claim 1, wherein the print setting specified with the item is a sheet size.

7. An information processing apparatus comprising:
a display; and
a control unit configured to perform operations that:
generate printing data in accordance with a setting value for an item for specifying a print setting in a printing apparatus;
present an application-side print setting interface associated with an application on a display, the application-side print setting interface providing for an item setting values corresponding to each option for the item and a driver setting option value corresponding to a driver setting option that provides an indication on the display that the item is allowed to be specified through a driver-side input interface;
receive a result of which option provided to the application is selected through the application-side print setting interface;
when the result received is the driver setting option, present the driver-side input interface which provides a setting value on the display as the setting value for the item and allow the setting value for the item to be changed through the driver-side input interface; and
when the result received is not the driver setting option, present the driver-side input interface which provides a setting value that corresponds to the option selected through the application-side print setting interface on the display as the setting value for the item.

8. The information processing apparatus according to claim 7, wherein the control unit includes
a processing unit; and
a memory having instructions stored thereon that, when executed by the processing unit, perform the operations.

9. The information processing apparatus according to claim 7, wherein the control unit is further configured to, when the result received is not the driver setting option, prevent the setting value for the item from being changed through the driver-side input interface.

10. The information processing apparatus according to claim 7, wherein the control unit is further configured to, when the result received is not the driver setting option, provide a notification that the setting value for the item has been set in the application-side print setting interface when an operation to change the setting value for the item has been attempted.

11. The information processing apparatus according to claim 7, wherein the control unit is further configured to, when the result received is not the driver setting option, present the setting value for the item on the display to indicate that the item is not allowed to be specified through the driver-side input interface.

12. The information processing apparatus according to claim 7, wherein the control unit is further configured to instruct the application to initially present the driver setting option value as the setting value for the item in the application-side print setting interface.

13. The information processing apparatus according to claim 7, wherein the print setting specified with the item is a sheet size.

14. A method performed by a processor executing a printer driver for controlling an information processing apparatus comprising:

presenting an application-side print setting interface associated with an application, the application-side print setting interface providing for an item setting values corresponding to each option for the item for specifying a print setting in a printing apparatus and a driver setting option value corresponding to a driver setting option that indicates that the item is allowed to be specified through a driver-side input interface for the printing apparatus;

receiving a result of which option presented to the application is selected through the application-side print setting interface;

when the result received is the driver setting option, displaying the driver-side input interface which provides a setting value as the setting value for the item and allowing the setting value for the item to be changed through the driver-side input interface; and when the result received is not the driver setting option, displaying the driver-side input interface which provides a setting value that corresponds to the option selected through the application-side print setting interface as the setting value for the item.

15. The method of claim 14 further comprising:

when the result received is not the driver setting option, preventing the setting value for the item from being changed through the driver-side input interface.

16. The method of claim 14 further comprising:

when the result received is not the driver setting option, providing a notification that the setting value for the item has been set in the application-side print setting interface when an operation to change the setting value for the item has been attempted.

17. The method of claim 14 further comprising:

when the result received is not the driver setting option, displaying the setting value for the item to indicate that the item is not allowed to be specified through the driver-side input interface.

18. The method of claim 14, further comprising:

instructing the application to initially present the driver setting option value as the setting value for the item in the application-side print setting interface.

19. The method of claim 14, wherein the print setting specified with the item is a sheet size.

* * * * *